(12) United States Patent
Hayashi

(10) Patent No.: US 10,777,933 B2
(45) Date of Patent: Sep. 15, 2020

(54) COVER MEMBER AND WIRE HARNESS

(71) Applicant: SUMITOMO WIRING SYSTEMS, LTD., Yokkaichi-shi, Mie (JP)

(72) Inventor: Masashi Hayashi, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/479,753

(22) PCT Filed: Jan. 18, 2018

(86) PCT No.: PCT/JP2018/001449
§ 371 (c)(1),
(2) Date: Jul. 22, 2019

(87) PCT Pub. No.: WO2018/139339
PCT Pub. Date: Aug. 2, 2018

(65) Prior Publication Data
US 2019/0379151 A1 Dec. 12, 2019

(30) Foreign Application Priority Data
Jan. 25, 2017 (JP) .................................. 2017-011299

(51) Int. Cl.
*H01R 13/52* (2006.01)
*B60R 16/02* (2006.01)
(Continued)

(52) U.S. Cl.
CPC ......... *H01R 13/52* (2013.01); *B60R 16/0215* (2013.01); *H01B 7/0045* (2013.01); *H02G 3/04* (2013.01)

(58) Field of Classification Search
CPC combination set(s) only.
See application file for complete search history.

(56) References Cited

U.S. PATENT DOCUMENTS

| 790,644 A | * | 5/1905 | Lloyd | B21D 39/04 |
| | | | | 29/890.14 |
| 3,455,336 A | * | 7/1969 | Ellis | H02G 15/1813 |
| | | | | 138/156 |

(Continued)

FOREIGN PATENT DOCUMENTS

| DE | 102007001584 A1 | * | 7/2008 | ................. F16L 5/02 |
| JP | S62043854 | * | 3/1987 | ............. H02G 15/08 |

(Continued)

OTHER PUBLICATIONS

Feb. 13, 2018 International Search Report issued in International Patent Application No. PCT/JP2018/001449.

*Primary Examiner* — Binh B Tran
*Assistant Examiner* — Krystal Robinson
(74) *Attorney, Agent, or Firm* — Oliff PLC

(57) ABSTRACT

A cover that includes an exterior tube configured to be attached to a protective tube through which an electrical wire is inserted; and a ventilation formed integrally with the exterior tube and configured to allow passage of gases and restrict passage of liquids, wherein: the exterior tube has a through hole communicating between an inside and an outside of the exterior tube, the ventilation includes a support having an opening and a ventilation film covering the opening of the support, the support is mounted on the exterior tube by being embedded in an inner wall surface of the through hole, and the ventilation is supported by the support around the opening without being embedded in the inner wall surface of the through hole.

7 Claims, 2 Drawing Sheets

(51) Int. Cl.
    *H01B 7/00*         (2006.01)
    *H02G 3/04*         (2006.01)

(56) References Cited

U.S. PATENT DOCUMENTS

| | | | | |
|---|---|---|---|---|
| 3,991,243 | A * | 11/1976 | Biddell | B29C 61/10 |
| | | | | 428/61 |
| 5,611,085 | A * | 3/1997 | Rasmussen | A41D 13/1245 |
| | | | | 2/102 |
| 5,914,415 | A * | 6/1999 | Tago | B01D 19/0031 |
| | | | | 55/385.4 |
| 10,128,643 | B2 * | 11/2018 | McDonald | H02G 3/0418 |
| 2008/0156554 | A1 * | 7/2008 | Noto | H01M 8/04552 |
| | | | | 180/65.31 |
| 2010/0219305 | A1 * | 9/2010 | Lloyd | B60R 11/00 |
| | | | | 248/201 |
| 2012/0114902 | A1 | 5/2012 | Furuyama et al. | |
| 2015/0101842 | A1 | 4/2015 | Han et al. | |
| 2016/0020000 | A1 * | 1/2016 | Doushita | F16B 21/086 |
| | | | | 174/72 A |
| 2016/0021730 | A1 * | 1/2016 | Decker | H05K 1/0207 |
| | | | | 361/720 |
| 2016/0164269 | A1 * | 6/2016 | Inao | H02G 3/0468 |
| | | | | 174/68.3 |
| 2018/0361083 | A1 * | 12/2018 | Casey | B05B 17/0646 |

FOREIGN PATENT DOCUMENTS

| | | |
|---|---|---|
| JP | H09-35807 A | 2/1997 |
| JP | 2010/143437 A | 7/2010 |
| JP | 2013-241143 A | 12/2013 |

* cited by examiner

COVER MEMBER AND WIRE HARNESS

This application is the U.S. National Phase of PCT/JP2018/001449 filed Jan. 18, 2018, which claims priority to JP 2017-011299 filed Jan. 25, 2017, the entire disclosure of which is incorporated herein by reference.

BACKGROUND

The present disclosure relates to a cover member and a wire harness.

Conventionally a vehicle such as an electric car or a hybrid car is provided with a wire harness that electrically connects a battery and an inverter, for example This wire harness is, for example, routed under the floor of the vehicle. The wire harness is provided with a plurality of electrical wires and a pipe that covers the plurality of electrical wires. A waterproof cover is mounted on an end portion of the pipe. The wire harness routed under the floor is formed as a sealed structure, and a ventilation member is mounted in order to suppress deformation caused by changes in the internal pressure following temperature changes (e.g., see JP 2013-241143A).

SUMMARY

Incidentally, a reduction in the number of components is sought with wire harnesses such as the above.

An exemplary aspect of the disclosure provides a cover member having few components.

A cover according to an exemplary aspect of the disclosure is provided with an exterior tube configured to be attached to a protective tube through which an electrical wire is inserted, and a ventilation formed integrally with the exterior tube and configured to allow passage of gases and restrict passage of liquids.

According to this configuration, by forming the ventilation integrally with the exterior tube, the number of components of the cover decreases, compared with the case where the ventilation is installed separately.

In the above cover, preferably the exterior tube has a through hole communicating between an inside and an outside of the exterior tube, and the ventilation is arranged in the through hole.

According to this configuration, parts protruding in order to install the ventilation separately on the exterior tube or the like are not required; in other words, the exterior tube is provided with fewer protruding parts.

In the above cover member, preferably the ventilation is formed by a frame-like support mounted on the exterior tube and a ventilation film supported by the support and configured to allow passage of gases and restrict passage of liquids.

According to this configuration, the ventilation film is supported by a frame-like support, thus enabling a thin ventilation film to be readily supported, and suppressing the occurrence of wrinkles and the like in the ventilation film.

A wire harness that solves the above problem is provided with a plurality of electrical wires, a protective tube through which the plurality of electrical wires are inserted, a connector to which the plurality of electrical wires are connected, and a cover attached so as to bridge between the connector and the protective tube, the cover including an exterior tube attached so as to bridge between the connector and the protective tube, and a ventilation formed integrally with the exterior tube and configured to allow passage of gases and restrict passage of liquids.

According to this configuration, by forming the ventilation integrally with the exterior tube in the cover attached so as to bridge between the connector and the protective tube, the number of components of the cover decreases, compared with the case where the ventilation is installed separately According to the cover and the wire harness of the present disclosure, the number of components can be reduced.

DETAILED DESCRIPTION OF EMBODIMENTS

Hereinafter, embodiments will be described.

Note that the accompanying drawings may show constituent elements in an enlarged manner in order to facilitate understanding. The size ratio of constituent elements may differ from actual size or from other diagrams. Also, in the cross-sectional view, hatching of some of the constituent elements has been omitted, in order to facilitate understanding.

Figure 1:
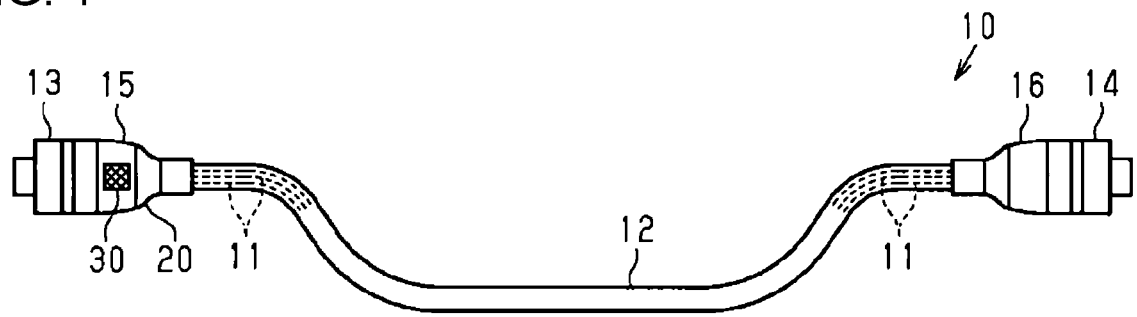
FIG. 1 is a schematic view of a wire harness.

A wire harness 10 shown in FIG. 1 is routed in a vehicle such as a hybrid car, for example. The wire harness 10 electrically connects a power source device of the vehicle serving as an electrical device and an inverter (both not shown).

The wire harness 10 has a plurality (e.g., three) of electrical wires 11, a protective tube 12 through which the electrical wires 11 are inserted, connectors 13 and 14 connected to end portions of the electrical wires 11, and cover members 15 and 16 (covers) that cover the connectors 13 and 14. The protective tube 12 protects the electrical wires 11 from water droplets, flying stones and the like. As the protective tube 12, a metal pipe such as an aluminum pipe or a flexible corrugated tube made of resin or the like, for example, can be used.

The connector 13 is connected to the power source device, for example, and the connector 14 is connected to the inverter, for example, The cover members 15 and 16 are formed to be generally tubular. The cover members 15 and 16 are attached to an outer peripheral surface of the protective tube 12. The cover members 15 and 16 are attached so as to bridge between the connectors 13 and 14 (connector shell or housing) and the protective tube 12. The cover members 15 and 16 are fixed by fastening to the outer side of the connectors 13 and 14 using fixing bands that are not shown, Also, the cover members 15 and 16 are fixed by fastening using fixed bands that are not shown to the outer side of the protective tube 12. The cover members 15 and 16 are respectively hermetically adhered to the outer side of the connectors 13 and 14 and the outer side of the protective tube.

Figure 2A:
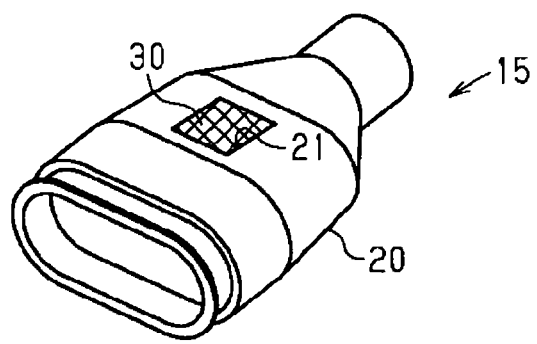
FIG. 2(a) is a perspective view of a cover member.

As shown in FIG. 2(a), the cover member 15 has an exterior member 20 (exterior tube) and a ventilation member 30 (ventilation) arranged on the exterior member 20.

The exterior member 20 is tubularly formed, The exterior member 20 is attached so as to bridge between the connector 13 and the protective tube 12. Rubber, elastomer or the like can be used as the material of the exterior member 20.

Figure 2B:
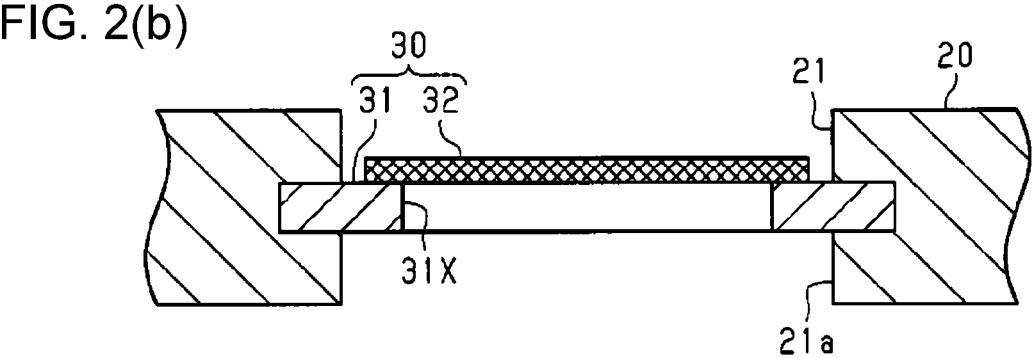
FIG. 2(b) is a partial cross-sectional view of the cover member.

As shown in FIG. 2(b), the exterior member 20 has a through hole 21 communicating between inside and outside of the exterior member 20. The through hole 21 is rectangularly formed when viewed from outside the exterior member 20, for example. The ventilation member 30 is arranged in the through hole 21 of the exterior member 20.

Figure 3:
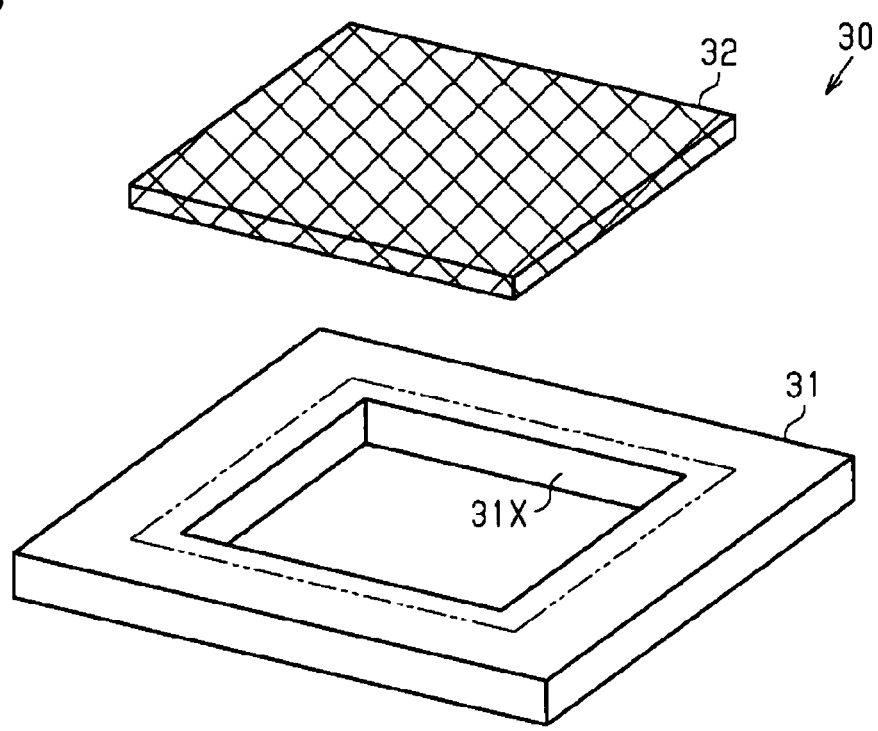
FIG. 3 is an exploded perspective view of a ventilation member.

As shown in FIG. 2(b) and FIG. 3, the ventilation member 30 includes a support member 31 (support) and a ventilation film 32 supported by the support member 31. The ventilation film 32 is a rectangular thin film having a predetermined thickness. The ventilation film 32 has a characteristic of allowing passage of gases and restricting passage of liquids. For this ventilation film 32, a porous body made of a fluorine resin such as polytetrafluoroethylene (PTFE) can be used, for example. Note that, as the ventilation film 32, other porous bodies may be used, such as a woven fabric, a nonwoven fabric, netting and foam, The support member 31 is formed in a frame-like shape having an opening portion 31X that corresponds to the shape of the ventilation film 32. The size of the opening portion 31X is set to be smaller than the size of the ventilation film 32. In FIG. 3, a two-dot chain line on the support member 31 shows the outline of the ventilation film 32. As shown in FIG. 2(b), the ventilation film 32 is adhered and fixed to an inner edge portion of the frame-like support member 31. As the material of the support member 31, a metal such as aluminum or iron or a resin such as epoxy, for example, can be used.

As shown in FIG. 2(b), an outer peripheral portion of the support member 31 is embedded in an inner wall surface 21a of the through hole 21 of the exterior member 20. Also, the surface of the outer peripheral portion of the support member 31 is adhered to the exterior member 20.

The cover member 15 can be formed by molding (e.g., two-color molding) that uses a mold, for example. In the case where the support member 31 is made of metal, for example, the cover member 15 that integrally includes the exterior member 20 and the ventilation member 30 can be formed, by setting the support member 31 in the mold, and molding the exterior member 20 and the ventilation film 32 in appropriate order. Also, in the case where the support member 31 is 1.0 formed using resin or the like, the cover member 15 that integrally includes the exterior member 20 and the ventilation member 30 can be formed, by molding the exterior member 20, the support member 31 and the ventilation film 32 in appropriate order.

Operation

As shown in FIG. 1, the cover members 15 and 16 are attached so as to bridge between the connectors 13 and 14 and the protective tube 12.

As shown in FIG. 2(a), the cover member 15 has the exterior member 20 and the ventilation member 30 arranged in the exterior member 20. As shown in FIG. 2(b) and FIG. 3, the ventilation member 30 includes the support member 31 and the ventilation film 32 supported by the support member 31. The ventilation film 32 has a characteristic of allowing passage of gases and restricting passage of liquids. Accordingly, due to the ventilation member 30, ventilation between inside and outside of the cover member 15 is secured, while preventing ingress of foreign matter such as water and dust into the cover member 15. Thus, even if there is a change in temperature, any change in the internal pressure of the wire harness 10 is suppressed due to ventilation resulting from the ventilation member 30.

As shown in FIG. 2(a), the cover member 15 is a single component, and includes the exterior member 20 and the ventilation member 30 formed integrally with the exterior member 20. Thus, as shown in FIG. 1, it suffices to attach the cover member 15 so as to bridge between the connector 13 and the protective tube 12. A process for managing or installing components can thus be omitted, compared with the case where the ventilation member 30 is installed separately.

In the present embodiment, as shown in FIG. 2(b), the ventilation member 30 is arranged in the through hole 21 formed in the exterior member 20. Accordingly parts for separately mounting the ventilation member are not required, and the cover member 15 has no parts protruding from the exterior member 20. In other words, there are few parts protruding from the surface of the exterior member 20. Thus, in the wire harness 10 shown in FIG. 1, the occurrence of issues such as other components catching on the wire harness 10 is thus suppressed.

As described above, according to the present embodiment, the following effects are achieved.

(1) The wire harness 10 has a plurality of electrical wires (e.g., three) 11, a protective tube 12 through which the electrical wires 11 are inserted, connectors 13 and 14 connected to end portions of the electrical wires 11, and cover members 15 and 16 that cover the connectors 13 and 14. The cover members 15 and 16 are attached so as to bridge between the connectors 13 and 14 and the protective tube 12. The cover member 15 has an exterior member 20 and a ventilation member 30 arranged on the exterior member 20. The exterior member 20 is tubularly formed. The exterior member 20 is attached so as to bridge between the connector 13 and the protective tube 12. The ventilation member 30 is formed integrally with, that is, inseparably from, the exterior member 20, and has a characteristic of allowing passage of gases and restricting passage of liquids.

In the present embodiment, by forming the ventilation member 30 integrally with, that is, inseparably from, the tubular exterior member 20, the number of components of the cover member 15 can be reduced, compared with the case where the ventilation member is installed separately.

(2) The exterior member 20 of the cover member 15 has a through hole 21 communicating between inside and outside of the exterior member 20. The ventilation member 30 is arranged in the through hole 21. Accordingly, parts protruding in order to separately install the ventilation member 30 on the exterior member 20 or the like are not required; in other words, the exterior member 20 can be provided with fewer protruding parts.

(3) The ventilation member 30 of the cover member 15 is constituted by a frame-like support member 31 mounted on the exterior member 20 and a ventilation film 32 supported by the support member 31 and having a characteristic of allowing passage of gases and restricting passage of liquids. Since the ventilation film 32 is supported by the frame-like support member 31, a thin ventilation film 32 can be readily supported. Also, the occurrence of wrinkles and the like in the ventilation film 32 can be suppressed.

Note that the above embodiments may be implemented in the follow modes.

In contrast to the above embodiment, the shape of the ventilation film 32 may be changed as appropriate to be other than rectangular, such as circular, triangular, or polygonal with five or more sides.

In contrast to the above embodiment, a configuration may be adopted in which a plurality of ventilation members 30 are arranged on one cover member 15.

In contrast to the above embodiment, the ventilation film 32 may be arranged so as to be on the inner side of the exterior member 20 relative to the support member 31.

Also, a configuration may be adopted in which a plurality of ventilation films 32 are fixed by adhesion to the support member 31. For example, a configuration may be adopted in which ventilation films 32 are arranged on the inner side and outer side of the exterior member 20 relative to the support member 31. Also, a configuration may be adopted in which a plurality of opening portions are formed in the support member 31, and two ventilation films are arranged in parallel on the outer side of the exterior member 20 relative to the support member 31.

In the above embodiment, as shown in FIG. 1, the cover member 15 having the ventilation member 30 is used at one end of the wire harness 10, but the cover member 16 at the other end may also be configured as a cover member having a ventilation member.

In the above embodiment, the present disclosure is applied to the wire harness 10 having the connectors 13 and 14 at both ends, but the present disclosure may be applied to a wire harness having a connector only at one end.

In the above embodiment, the present disclosure is applied to the cover member 15 covering the connector 13, but the present disclosure may be applied to a cover member that covers housing such as a bracket that is fixed to an electrical device.

In the above embodiment, the protective tube 12 may, for example, be a protective tube having a structure in which conductive shield wires are stacked on or buried in a nonmetallic (resin, etc.) pipe body.

It will be apparent to a person skilled in the art that the present disclosure may be embodied in other specific forms without departing from the technical idea thereof. For example, some of the components described in the embodiment (or one or more modes) may be omitted or a number of components may be combined.

The invention claimed is:

1. A wire harness comprising:
    a plurality of electrical wires;
    a protective tube through which the plurality of electrical wires are inserted;
    a connector to which the plurality of electrical wires are connected; and
    a cover attached so as to bridge between the connector and the protective tube, wherein:
    the cover includes:
        an exterior tube attached so as to bridge between the connector and the protective tube; and
        a ventilation formed integrally with the exterior tube and configured to allow passage of gases and restrict passage of liquids,
    an outer surface of the exterior tube has a through hole communicating between an inside and an outside of the exterior tube,
    the ventilation includes a support having an opening and a ventilation film covering the opening of the support,
    the support is mounted on the exterior tube by being embedded in an inner wall surface of the through hole, and
    the ventilation is supported by the support around the opening without being embedded in the inner wall surface of the through hole.

2. The wire harness according to claim 1, wherein a size of the opening of the ventilation is smaller than a size of the ventilation film.

3. The wire harness according to claim 1, wherein a plurality of the ventilation films are fixed by adhesion to the support.

4. The wire harness according to claim 3, wherein the plurality of the ventilation films are arranged on an inner side and an outer side of the exterior tube relative to the support.

5. The wire harness according to claim 1, wherein the connector is disposed at both ends of the wire harness.

6. The wire harness according to claim 1, wherein the cover at least partially covers the connector to bridge between the connector and the protective tube.

7. The wire harness according to claim 1, wherein the protective tube has a structure in which the plurality of electrical wires, which are conductive shield wires, are stacked on or buried in a nonmetallic pipe body.

* * * * *